United States Patent Office 3,127,275
Patented Mar. 31, 1964

3,127,275
FLAVOR STABILIZATION OF MILK FAT
Stuart Patton, Boalsburg, Pa., assignor to Research Corporation, New York, N.Y., a corporation of New York
No Drawing. Filed Oct. 15, 1959, Ser. No. 846,550
3 Claims. (Cl. 99—203)

This invention relates to the stabilization of the flavor of milk fat and milk fat-containing products, particularly whole milk.

Although non-fat dry milk solids (dry skim milk) is capable of undergoing prolonged unrefrigerated storage without undergoing objectionable deterioration of its fresh properties, this is not true of dry whole milk as presently produced which develops on storage flavors, which even though they may not be unpleasant, render the reconstituted milk product unacceptable as a substitute for whole fresh milk.

The development of grosser off-flavors due to oxidative processes can be largely eliminated by antioxygenic measures such as vacuum or inert gas packing or treatment with antioxidants or combinations of such measures, but these measures have been found to be ineffective in the prevention of off-flavors arising from non-oxidative processes but only serve to bring them to light. These non-oxidative off-flavors are characterized by a buttery-coconut character, which is readily detected, particularly in the absence of strong oxidative off-flavors.

The processes involved in the production of these non-oxidative off-flavors are heat-accelerated. They proceed at a substantial rate on storage at ordinary temperatures. They may be delayed by the uneconomic expedient of refrigerative storage and are accelerated by heat treatment such as that occurring in the common spray-drying method for the production of dry milk products.

Research has indicated that at least a substantial portion of the non-oxidative off-flavor which develops on storage of dry milk fat containing products is due to the formation of delta-decalactone. It is also probable that homologous lactones as well as members of a homologous series of methyl ketones play a part in the development of non-oxidative off-flavors on storage.

I have now found the development of these non-oxidative off-flavors may be largely eliminated by subjecting the separated milk fat to action of steam under relatively high vacuum. It is believed that the beneficial effect of this treatment is due to the substantial elimination from the milk fat of the aforesaid lactones and ketones and their precursors and possibly of other substances capable of development of off-flavors by non-oxidative processes.

The method of treatment comprises passing steam through the milk fat under high vacuum and at a temperature in excess of 100° C. More particularly, treatment of milk fat with steam at temperatures in the range of 125–200° C. under pressures of from about 1 to 20 mm. of Hg, for a period of about 1 to 3 hours will eliminate substantially completely the production of the above-described non-oxidative off-flavors during heat treatment or storage.

The following is an illustrative example of the production of flavor stabilized dry whole milk embodying the method of the invention.

Raw whole milk is separated into skim milk and cream (35% fat). The cream is churned at 10–12° C. and the butter washed with cold water (5–7° C.) in volume equivalent to that of the original cream. The butter is melted at 50° C. and washed with approximately twice its volume of hot water (50–55° C.) and separated in a cream separator. The washing is repeated until the wash water removed by the separator is reasonably clear.

To the melted butter fat is then added 0.05% by weight of citric acid, as a 20% aqueous solution to inhibit the pro-oxidative effect of metallic contaminants and the butter fat is placed in a vessel equipped with a heating and cooling jacket, agitator, thermometer, a steam inlet opening near the bottom of the vessel, and a vapor outlet connected to a source of vacuum. The butter fat is heated to 200° C. with the vessel placed under a vacuum of about 5 mm. of Hg and steam is passed through the butter fat for about three hours. The steam is now shut off and the butter fat is cooled with stirring. When the fat has reached a temperature below 90° C., a 0.1% by weight of anti-oxidant (Eastman Tenox S-1, containing 20% propyl gallate, 10% citric acid and 70% ethylene glycol) is added.

The skim milk and buttermilk previously separated from the butter are mixed and condensed at 57–60° C. under a vacuum of 24–25 inches of Hg to about 32% total solids. The steam-treated butter fat is then re-emulsified in the condensed milk product with the aid of an homogenizer in proportion to provide a ratio of solids-not-fat to fat of about 2 to 1. The re-emulsified product is then spray dried.

A product made in this manner and packed under nitrogen will maintain its satisfactory flavor in unrefrigerated storage for over six months.

In addition to its use in dry whole milk the flavor stabilized milk fat of the invention may be utilized in other products such as dried ice cream mix, dry cream powders and the like.

The condensed volatiles from the steam treatment of milk fat provide a flavor concentrate of a butter or butterscotch character which may be used for flavoring other fats or food products.

I claim:
1. A method of making flavor-stabilized milk products which comprises separating milk fat from whole milk, subjecting the separated milk fat to the action of steam under a high vacuum at a temperature exceeding 100° C. for at least one hour and emulsifying the steam treated milk fat with fat-free milk.

2. A method of making flavor-stabilized milk products which comprises separating milk fat from whole milk, subjecting the separated milk fat to the action of steam under a high vacuum at a temperature exceeding 100° C. until substantially all of the delta-decalactone and substances convertible thereto by heat are removed from the milk fat and emulsifying the steam treated milk fat with fat-free milk.

3. A method of making flavor-stabilized dry milk products which comprises separating milk fat from whole milk, subjecting the separated milk fat to the action of steam under a high vacuum at a temperature exceeding 100° C. until substantially all of the delta-decalactone and substances convertible thereto by heat are removed from the milk fat, emulsifying the steam treated milk fat with partially condensed fat-free milk and spray-drying the emulsified product.

References Cited in the file of this patent

UNITED STATES PATENTS

| | | |
|---|---|---|
| 1,274,175 | Lowenstein | July 30, 1918 |
| 1,385,660 | Bodman et al. | July 26, 1921 |
| 1,413,092 | Baker | Apr. 18, 1922 |
| 1,554,151 | White | Sept. 15, 1925 |
| 1,943,146 | Rust | Jan. 9, 1934 |
| 2,014,580 | Murray | Sept. 17, 1935 |
| 2,182,335 | Davis | Dec. 5, 1939 |
| 2,407,616 | Phelps et al. | Sept. 10, 1946 |

OTHER REFERENCES

J. Dairy Science, vol. XXXIX, No. 8, August 1956, pp. 1114–1119. (Copy in Div. 63.)